2,893,202

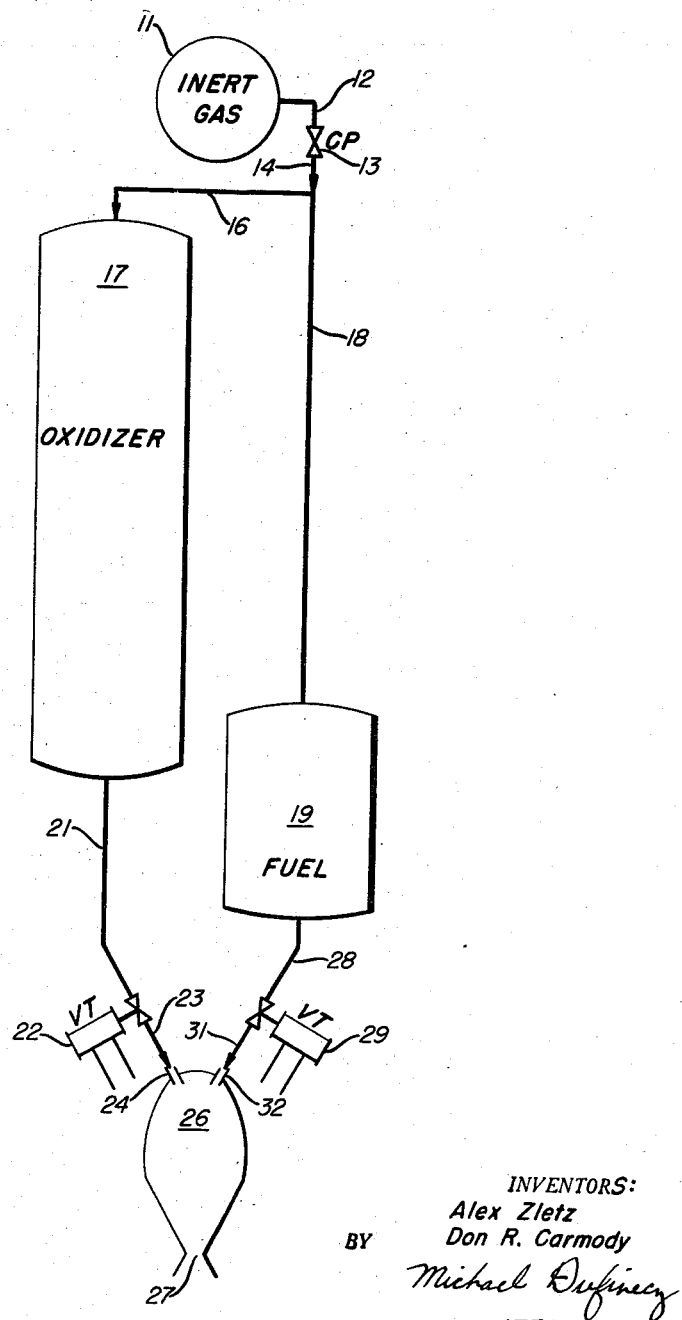

ROCKET PROPULSION METHOD

Alex Zletz, Park Forest, and Don R. Carmody, Crete, Ill., assignors to Standard Oil Company, Chicago, Ill., a corporation of Indiana Application December 15, 1953, Serial No. 398,245

2 Claims. (Cl. 60—35.4)

This invention relates to gas generation and rocket propulsion. More particularly the invention relates to a liquid rocket fuel which is suitable for use at very low atmospheric temperatures.

Bipropellant rockets have assumed a larger and larger place in the military and commercial fields both in missiles and in the assisted take-off of aircraft. In the bipropellant rocket a liquid fuel and a liquid oxidizer are injected separately and substantially simultaneously into the combustion chamber of the rocket motor; the fuel and oxidizer ignite hypergolically or are ignited by an external system such as a spark plug and burn to form a large volume of gases at high temperature; these gases are passed from the combustion chamber by way of an exit orifice.

A hypergolic fuel-oxidizer system is preferred because an auxiliary igniting system is thereby eliminated. In general the hypergolic activity of liquid fuels and nitric acid oxidizers decreases markedly with lowering of the temperature of the fuel and oxidizer. An air-to-air missile usually is exposed to the extreme cold of high altitudes for a period long enough to substantially attain atmospheric temperature. At the altitudes now commonly utilized by military aircraft, temperatures on the order of about $-65°$ F. are customary and $-100°$ F. is not uncommon.

Not only must the fuel have a melting point below about $-65°$ F., but also the fuel should have a viscosity low enough to flow readily through the fuel lines at very low atmospheric temperatures, i.e., about $-65°$ F. or lower.

The presently known liquid rocket fuels which fulfill these requirements are extremely expensive; for most of these the price is quoted in dollars per pound. More economical fuels which meet these severe requirements are desired in order to expand the field of usefulness of rocket-propelled vehicles.

An object of this invention is a rocket fuel which is suitable for use at very low atmospheric temperatures, i.e., below about $-65°$ F. Another object is a liquid rocket fuel which is suitable for use at very low atmospheric temperatures and which is less expensive than the presently known fuels. Still another object is a method of gas generation by the hypergolic reaction of a nitric acid oxidizer and a liquid rocket fuel at very low atmospheric temperatures. Yet another object is a method of rocket propulsion by the hypergolic reaction of the nitric acid oxidizer and a liquid rocket fuel at very low atmospheric temperatures.

It has been found that a composition consisting essentially of between about 25 and about 50 volume percent of an aliphatic phosphine and the remainder an olefin containing between about 7 and 20 carbon atoms is suitable for use as a hypergolic rocket fuel with certain nitric acid oxidizers at very low atmospheric temperatures.

The aliphatic phosphine component is selected from at least one member of the class consisting of:

A. Monoaliphatic phosphines which contain not more than 16 carbon atoms, and

B. Dialiphatic phosphines which contain not more than 16 carbon atoms.

The above-defined fuel composition has satisfactory hypergolic activity with certain nitric acid oxidizers, hereinafter defined, when the fuel and the oxidizer at the moment of contact in the gas generation chamber or the rocket motor are at a temperature below about $-65°$ F.

Certain monoaliphatic phosphines, dialiphatic phosphines, trialiphatic phosphines and mixtures thereof are useful for the purposes of this invention. The term "aliphatic" as used herein is intended to include hydrocarbon groups selected from the class consisting of paraffins and olefins. Highly branched aliphatic groups have desirably lower freezing points than the straight chain or slightly branched groups. It is preferred to use branched aliphatic groups. The pressure of unsaturated linkages in the aliphatic group improves the hypergolic activity.

The hypergolic activity of the various aliphatic phosphines is dependent upon the number of aliphatic groups, upon the total number of carbon atoms contained in the aliphatic phosphine, and upon the number of carbon atoms contained in each of the aliphatic groups. In order to obtain a mixed fuel which is usable at temperatures as low as $-65°$ F., it is necessary that the monoaliphatic phosphines contain not more than 16 carbon atoms. The phosphines which contain two aliphatic substituents, i.e., dialiphatic phosphines, must contain not more than 16 carbon atoms in the molecule. Thus a dialiphatic phosphine which contains a 15 carbon atom side chain must not contain more than 1 carbon atom in the second side chain. The completely substituted phosphines, i.e., trialiphatic phosphines are not particularly suitable for the purposes of this invention; however, small amounts of these may be tolerated along with mono- and di-aliphatic phosphines.

It is preferred to use the monoaliphatic phosphines or a natural mixture of monoaliphatic phosphines and dialiphatic phosphines as obtained in the reaction of $PH_3$ and an olefin, i.e., not more than about 20 mol percent of dialiphatic phosphine and a slight amount of trialiphatic phosphine.

The rocket fuel composition of this invention contains as the other component a normally liquid olefin that is essentially non-hypergolic with white fuming nitric acid at ordinary atmospheric temperatures, i.e, below about $80°$ F. (An essentially non-hypergolic hydrocargon is one that does not react with nitric acid oxidizer to produce a visible flame although gaseous products may be produced.) In order to avoid boiling at the low pressure of high altitude, the olefin used herein contains at least 7 carbon atoms. Satisfactory hypergolic activity of the blend requires an olefin containing not more than 20 carbon atoms. The polymers formed by the homo- or co-polymerization of propylene and butylenes are the preferred olefins. Examples of these are propylene trimer and tetramer; butylene dimer, trimer and tetramer; di-isobutylene; and propylene-butylene polymer containing 7 carbon atoms.

Several methods are known for the preparation of the aliphatic phosphines, e.g., the method of W. C. Davies and W. J. Jones as described in J. Chem. Soc. (London), p. 33 (1929); also, that of W. C. Davies in J. Chem. Soc. (London), p. 1043 (1933). Both of these methods involve the Grignard reaction. However, it is preferred to use the method described in U.S. Patent 2,584,112 which involves the reaction of phosphine, $PH_3$ and an olefin, in the presence of an acid catalyst; or the same reaction in the presence of a peroxy catalyst.

The products from all of these methods of preparation contain minor amounts of impurities. These impurities have a favorable effect on the freezing point of the aliphatic phosphines and appear to have no substantial adverse effect on hypergolic activity. It has also been found that the aliphatic phosphines which have been oxidized to a minor extent, e.g., 4 or 5%, are useful as hypergolic fuels. It is intended to include within the scope of the invention the use of aliphatic phosphines which contain minor amounts of impurities resulting from the preparation thereof and also those which contain minor amounts of oxidation products resulting from the oxidation of the aliphatic phosphine.

The preferred mixed fuel of this invention consists of a blend of a monoaliphatic phosphine and the olefin corresponding to the aliphatic group of the phosphine. To illustrate: A blend of dodecenes and mono(dodecyl)phosphine.

More particularly, the mixed fuel of this invention is prepared by reacting the desired olefin with $PH_3$, in the presence of a non-oxidizing acid catalyst. The desired ratio of olefin to aliphatic phosphine in the reaction product mixture is obtained by using a sufficient excess of olefin. The other conditions are adjusted to produce an aliphatic phosphine product containing only a small amount of the di-derivative and only a slight amount of the tri-derivative; the monoaliphatic phosphine forms between 80 and 90 mol percent of the total aliphatic phosphine product.

The aliphatic phosphines are almost completely miscible in the normally liquid olefins at temperatures below $-100°$ F. Also the blends possess good viscosities at these very low temperatures. A fuel of satisfactory hypergolic activity at very low atmospheric temperature contains at least about 25 volume percent of the defined aliphatic phosphine and the remainder the defined olefin. When using about an equi-volume blend, the mixed fuel has a hypergolic activity at temperatures below about $-65°$ F. substantially equal to that of the aliphatic phosphine component itself.

The rocket fuel composition of the invention is hypergolic at ordinary temperatures, i.e., about 75° F., with most nitric acid oxidizers. At temperatures on the order of 0° F. it is hypergolic with nitric acid oxidizers containing as much as 5 weight percent of non-acidic materials. These non-acidic materials may be water or pour point depressors such as potassium nitrite or sodium nitrate. At very low atmospheric temperatures such as $-65°$ F., the nitric acid oxidizers are selected from the class consisting of red fuming nitric acid, nitric acid-oleum mixtures and nitric acid-alkanesulfonic acid mixture. The nitric acid-oleum mixtures consist of white fuming nitric acid and oleum, for example, an 80:20 mixture. The nitric acid-alkanesulfonic acid mixtures may consist of mixtures of WFNA and methanesulfonic acid, ethanesulfonic acid, propanesulfonic acid, etc. Only enough oleum or alkanesulfonic acid is present to give a freezing point somewhat lower than the desired initial temperature of operation. Red fuming nitric acid containing at least about 16% of $N_2O_4$ is the preferred oxidizer at very low temperatures.

The results obtainable with the mixed fuel of this invention are illustrated by the following example.

TEST 1

Commercial grade diisobutylene was carefully fractionated to obtain a heart cut corresponding to pure diisobutylene. The pure diisobutylene was reacted with $PH_3$ in a stainless steel bomb. One-half mol of diisobutylene and 0.5 mol of methanesulfonic acid catalyst were placed in the bomb at room temperature. One-half mol of $PH_3$ was added to the bomb. The entire assembly was agitated by a rocker device, while the bomb was being heated to $+85°$ C.; the bomb was rocked for one hour at $+85°$ C. The bomb was permitted to stand overnight without adding any further heat. The liquid contents were removed from the bomb and washed with dilute aqueous NaCl to remove methanesulfonic acid.

The neutralized liquid was distilled to remove diisobutylene. A fraction corresponding to mono(diisobutyl)phosphine was taken overhead. This fraction boiled at 85.5 to 86.0° C. (88 mm. Hg) and had a melting point of $-70.0$ to $-69.5°$ C. The bottoms fraction comprised essentially di(diisobutyl)phosphine. The mono-fraction consisted of 0.28 mol and the bottoms fraction consisted of 0.06 mol. Thus the yield based on olefin was 80%.

The ignition delays of the mono(diisobutyl)phosphine, blends of the mono-derivative and diisobutylene, and a blend of mono-derivative and commercial grade isooctane were determined at various temperatures. (The ignition delay is defined as the time between the mixing of the fuel and the oxidizer and the appearance of a visible flame.) The ignition delays in this example were determined by means of an apparatus which permitted the measurement of the delay in milliseconds. The ignition delays were determined by cooling the fuel and the oxidizer separately to the desired temperature. The oxidizer in the $+75°$ F. experiment was white fuming nitric acid which contained about 2 weight percent of water. The other experiments were carried out using red fuming nitric acid containing 22 weight percent of $N_2O_4$. The data derived in these tests are set out in Table I.

The diisobutylene and isooctane showed no hypergolic activity with WFNA at $+75°$ F.

In an air-to-air missile, an ignition delay of as much as 100 milliseconds is tolerable. Preferably, the delay should be below 50 milliseconds. The above data show that an acceptable mixed fuel can be obtained by blending about 25 volume percent of aliphatic phosphine and the remainder an olefin—particularly the olefin corresponding to the aliphatic group.

The blend containing equal volumes of aliphatic phosphine and olefin is essentially as good a fuel at the lower temperatures as the pure aliphatic phosphine itself. Since this equal volume blend is essentially the equal of the pure aliphatic phosphine itself, there is no reason for using more than this amount of aliphatic phosphine in the mixed fuel. Considerations of economy and thrust require the use of the least amount of aliphatic phosphine consistent with the ignition delay desired.

The completely unacceptable performance of the isooctane blend at lower temperatures is most surprising in view of the compartively equal performance of the three blends at $+75°$ F. And this shows an unpredictably favorable influence of a single unsaturated bond in the diluent hydrocarbon on low temperature performance.

Table I

[Ignition delay, milliseconds]

| Temperature, °F. | Mono-(diisobutyl)Phosphine | Mono-: 50% Diisobutylene: 50% | Mono-: 30% Diisobutylene: 70% | Mono-: 50% Isooctane: 50% |
|---|---|---|---|---|
| +75 | 6.3 | 15.7 | 29.8 | 24.5 |
| −40 | 18.0 | 21.2 | 59.1 | >300 |
| −65 | | | 23.2 | No Ignition. |
| −85 | 23.1 | 25.9 | 83.2 | |
| −92 | 28.3 | | | |
| −100 | | 31.0 | 97.2 | |

By way of illustration the composition of this invention is applied to the propulsion of an air-to-air missile. The annexed figure which forms a part of this specification shows schematically the bipropellant fuel system, the motor and other parts of such a missile.

In the figure vessel 11 contains a quantity of gas at high pressure; this gas must be inert with respect to the oxidizer and the fuel; suitable gases are nitrogen and helium. Herein helium is used as the inert gas. Helium from vessel 11 is passed through line 12 and through valve 13 which regulates the flow of gas to maintain a constant pressure beyond valve 13. From valve 13 helium is passed through lines 14 and 16 into vessel 17 and simultaneously through line 18 into vessel 19.

Vessel 17 contains the oxidizer. Helium pressure forces the oxidizer out of vessel 17 through line 21 to valve 22. Valve 22 is a solenoid actuated throttling valve. Suitable electrical lines connect valve 22 to an electrical source and operating switch (not shown) at the control panel of the aircraft. The oxidizer is passed through line 23 and injector 24 into combustion chamber 26. Combustion chamber 26 is provided with an outlet nozzle 27.

Vessel 19 contains the fuel. Vessels 17 and 19 are constructed to withstand the high pressure imposed by the helium gas. The gas pressure forces fuel from vesel 19 through line 28 to solenoid actuated throttling valve 29. Valve 29 is similar in construction and in actuation to valve 22. The fuel is passed through line 31 and injector 32 into combustion chamber 26.

Valves 22 and 29 are of such a size and setting that a predetermined ratio of oxidizer-to-fuel is passed into combustion chamber 26. Injectors 24 and 32 are so arranged that the streams of oxidizer and fuel converge and contact each other forcibly, resulting in a very thorough intermingling of the fuel and the oxidizer.

The missile is launched by activating the solenoids on valves 22 and 29. In this illustration 4.5 lbs. of 22% RFNA are introduced into combustion chamber 26 per pound of fuel. Herein the fuel consists of 45 volume percent of a monoalkyl phosphine containing 10 carbon atoms and 55 volume percent of the corresponding decenes. The oxidizer and the fuel react almost instantaneously upon contact in the combustion chamber; a large volume of very hot gas is produced in the combustion chamber, which gas escapes through orifice 27. The reaction from this expulsion of gas drives the missile toward its target.

Thus having described the invention, what is claimed is.

1. A method of rocket propulsion, which method comprises injecting separately and substantially simultaneously into the combustion chamber of a rocket motor a nitric acid oxidizer selected from the group consisting of white fuming nitric acid and red fuming nitric acid and a hypergolic liquid fuel consisting essentially of about equal volumes of mono(di-isobutyl)phosphine and di-isobutylene, in an amount and at a rate sufficient to initiate a hypergolic reaction with and to support combustion of the fuel.

2. The method of claim 1 wherein said oxidizer is red fuming nitric acid.

References Cited in the file of this patent

UNITED STATES PATENTS

| | | |
|---|---|---|
| 53,695 | Somes | Apr. 3, 1866 |
| 2,368,866 | Nygaard et al. | Feb. 6, 1945 |
| 2,573,471 | Malina et al. | Oct. 30, 1951 |
| 2,584,112 | Brown | Feb. 5, 1952 |

OTHER REFERENCES

Journal of the American Rocket Society, No. 72, December 1947, pp. 12, 17, 21, 31–33.